(12) United States Patent
Sisbot et al.

(10) Patent No.: US 9,212,921 B1
(45) Date of Patent: Dec. 15, 2015

(54) DETERMINING PROBLEMATIC TRAVEL CONDITIONS

(71) Applicants: TOYOTA JIDOSHA KABUSHIKI KAISHA, Toyota-shi, Aichi-ken (JP); DENSO CORPORATION, Kariya-shi, Aichi-ken (JP)

(72) Inventors: Emrah Akin Sisbot, Mountain View, CA (US); Veera Ganesh Yalla, Sunnyvale, CA (US); Hirokazu Nomoto, Aichi-ken (JP); Takuya Hasegawa, Kariya (JP)

(73) Assignees: TOYOTA JIDOSHA KABUSHIKI KAISHA, Toyota-she (JP); DENSO CORPORATION, Kariya-shi (JP)

( * ) Notice: Subject to any disclaimer, the term of this patent is extended or adjusted under 35 U.S.C. 154(b) by 0 days.

(21) Appl. No.: 14/515,268

(22) Filed: Oct. 15, 2014

(51) Int. Cl.
*G01S 1/00* (2006.01)
*G01C 21/34* (2006.01)

(52) U.S. Cl.
CPC ..................................... *G01C 21/34* (2013.01)

(58) Field of Classification Search
CPC ........... G01C 21/3691; G01C 21/3694; G01C 21/3697
See application file for complete search history.

(56) References Cited

U.S. PATENT DOCUMENTS

2014/0308978 A1* 10/2014 Herz et al. ................. 455/456.3

FOREIGN PATENT DOCUMENTS

JP 2007050795 A 1/2007
JP 2009145060 A 2/2009

* cited by examiner

*Primary Examiner* — Michael D Lang
(74) *Attorney, Agent, or Firm* — Burbage Law, P.C.; Jon Burbage

(57) ABSTRACT

The disclosure includes a method that includes determining a location that corresponds to a problematic travel condition based on data associated with when a first client device is at the location. The method may further include notifying, a second client device with a possible travel route that includes the location, that the location includes the problematic travel condition.

21 Claims, 8 Drawing Sheets

DETERMINING PROBLEMATIC TRAVEL CONDITIONS

BACKGROUND

The specification relates to determining locations along a travel route that may include problematic travel conditions.

Routes of travel, e.g., roads, may include locations that have problematic travel conditions which may create situations where heightened attention may be desired of an operator of a vehicle traveling in an area that includes the locations. For example, problematic travel conditions for a road may include a turn, a series of turns, an obstacle, a construction area, reduced visibility, ice on the road, a narrow area, reduced lane numbers, roadkill, water on the road, etc.

SUMMARY

According to one innovative aspect of the subject matter described in this disclosure, a system includes one or more processors and a memory communicatively coupled to the one or more processors. The memory stores instructions that, when executed by the one or more processors, cause the system to determine a location that corresponds to a problematic travel condition based on data associated with when a first client device is at the location. The instructions may further cause the system to notify a second client device with a possible travel route that includes the location, of the problematic travel condition at the location.

In general, another innovative aspect of the subject matter described in this disclosure may be embodied in one or more methods that include determining a location that corresponds to a problematic travel condition based on data associated with when a first client device is at the location. The method may further include notifying, a second client device with a possible travel route that includes the location, that the location includes the problematic travel condition.

Other aspects include corresponding methods, systems, apparatus, and computer program products for these and other innovative aspects.

The disclosure is particularly advantageous in a number of respects. For example, the systems and methods described herein may be used to notify an operator of a vehicle, e.g., via a notification to an associated client device, that the vehicle is about to encounter a location with a problematic travel condition. The operator may then prepare for the problematic travel condition before encountering such at the location. Further, the notification to the client device may allow for generating a travel route that avoids one or more problematic locations. In these or other implementations, the locations that correspond to problematic travel conditions may be highlighted on a determined travel route such that the locations may be anticipated in advance of taking the travel route.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

System Overview

Figure 1:
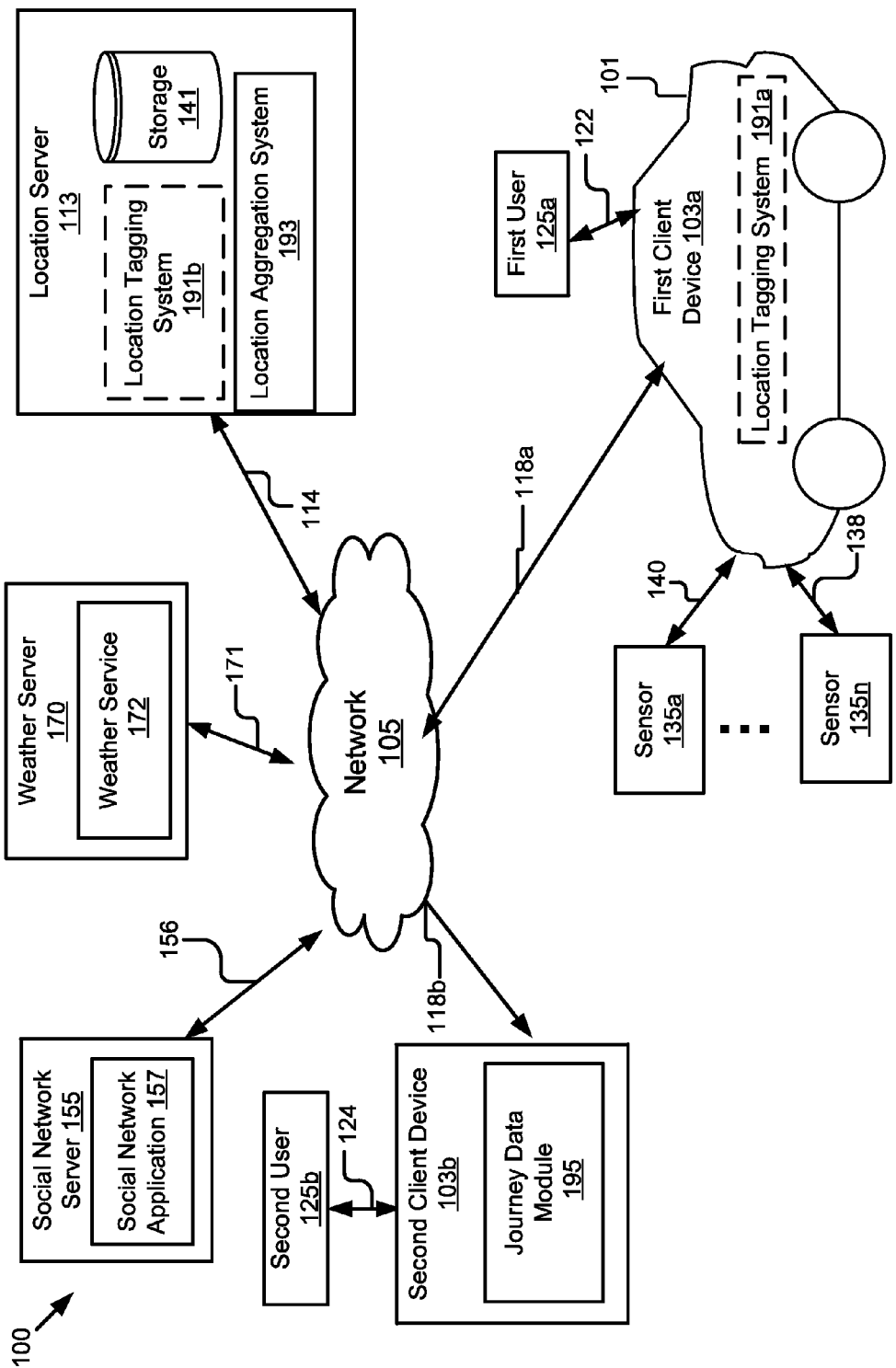
FIG. 1 is a block diagram illustrating an example system for determining and notifying of travel route locations with problematic travel conditions.

FIG. 1 is a block diagram illustrating an example system 100 for determining and notifying of travel route locations with problematic travel conditions. Problematic travel conditions may include any condition here heightened attention may be desired of an operator of a vehicle traveling in an area that includes the problematic travel conditions. For example, problematic travel conditions for a road may include a turn, a series of turns, an obstacle, a construction area, reduced visibility, ice on the road, water on the road, fog, reduced lighting, glare, a narrow area, reduced lane numbers, road kill, slick areas, etc.

In the illustrated implementation, the system 100 may include a first client device 103a, a second client device 103b, a social network server 155, a weather server 170, and a location server 113. In the illustrated implementation, two or more of these entities may be communicatively coupled by a network 105. The system 100 may include other servers or devices not shown in FIG. 1 including, for example, a traffic server for providing traffic data and a map server for providing map data, etc. The first client device 103a may be accessed by a first user 125a via a signal line 122 and the second client device 103b may be accessed by a second user 125b via a signal line 124.

The first client device 103a and the second client device 103b in FIG. 1 are illustrated by way of example. While FIG. 1 illustrates two client devices 103, the disclosure applies to a system architecture having different numbers of client devices 103. Furthermore, although FIG. 1 illustrates one network 105 coupled to the client devices 103, the social network server 155, the weather server 170, and the location server 113, in practice one or more networks may be connected to any two or more of these entities. Additionally, while FIG. 1 depicts the system 100 as including one social network server 155, one weather server 170, and one location server 113, the system 100 may include any number of social network servers 155, weather servers 170, and location servers 113.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some implementations, the network 105 may include a peer-to-peer network. The network 105 may also be coupled to or may include portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, etc. In some implementations, the network 105 may include a global positioning system (GPS) satellite or multiple GPS satellites for providing GPS navigation to the client devices 103. The network 105 may also include a mobile data network that may include third-generation (3G), fourth-generation (4G), long-term evolution (LTE), Voice-over-LTE ("VoLTE") or any other mobile data network or combination of mobile data networks. Further, the network 105 may include one or more IEEE 802.11 wireless networks.

The client devices 103 may each be a hardware device that includes a processor, a memory, and network communication capabilities. In the illustrated implementation, the first client device 103a and the second client device 103b are coupled to the network 105 via signal lines 118a and 118b, respectively. The client devices 103 may send or receive data to or from other entities of the system 100 via the network 105. The client devices 103 may include a vehicle (e.g., an automobile, a bus), a bionic implant, a wearable device, a laptop computer, a tablet computer, a mobile telephone, a personal digital assistant (PDA), a mobile e-mail device, a portable game player, a portable music player, or another electronic device.

The weather server 170 may be a hardware device that includes a processor, a memory, and network communication capabilities. In the illustrated implementation, the weather server 170 is coupled to the network 105 via a signal line 171. The weather server 170 may send and receive data to and from other entities of the system 100 via the network 105. For example, the weather server 170 may send weather data to other entities of the system 100 via the network 105

The weather server 170 may include a weather service 172. The weather service 172 may be configured to track, record, and/or communicate weather data corresponding to one or more locations. The weather data may include information regarding temperature, amount of precipitation, humidity, presence of fog, presence of snow, presence of rain, presence of sleet, presence of hail, wind conditions, sunrise, sunset, etc. As detailed below, in some implementations, the weather data associated with a particular location may be tracked with problematic travel conditions at the particular location. As such, a correlation between weather conditions and problematic travel conditions at the particular location may be determined. For example, problematic travel conditions may be determined for a particular location when the particular location is experiencing precipitation (e.g., rain or snow) or has recently had precipitation, but not when little to no precipitation has been present at the particular location for a certain period of time. As such, the problematic travel condition at the particular location may be correlated with the particular location experiencing precipitation.

The social network server 155 may be a hardware server that includes a processor, a memory, and network communication capabilities. In the illustrated implementation, the social network server 155 is coupled to the network 105 via a signal line 156. The social network server 155 sends and receives data to and from other entities of the system 100 via the network 105. The social network server 155 includes a social network application 157. A social network can be a type of social structure where users may be connected by a common feature or features. Each of the common features may include relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related.

The social network server 155 and the social network application 157 can be representative of one social network and there may be multiple social networks coupled to the network 105, each having its own server, application, and social graph. For example, a first social network may be more directed to business networking, a second may be more directed to or centered on academics, a third may be more directed to local business, a fourth may be directed to dating, and others may be of general interest or a specific focus. In some implementations, a user of the social network associated with the social network server 155 (e.g., the first user 125a or the second user 125b) may indicate locations with problematic travel conditions on the social network.

The location server 113 may be a hardware device that includes a processor, a memory, and network communication capabilities. In the illustrated implementation, the location server 113 is coupled to the network 105 via a signal line 114. The location server 113 may send and receive data to and from other entities of the system 100 via the network 105. For example, the location server 113 may send or receive problematic travel location data to or from the client devices 103 via the network 105.

In the illustrated example, the first client device 103a may include a location tagging system 191a and the location server 113 may include a location tagging system 191b. In the present disclosure, the location tagging systems 191 are described as being configured to perform various operations. Depending on the implementation, the location tagging system 191b associated with the location server 113 may be configured to perform all the corresponding operations and/or the location tagging system 191a associated with the first client device 103a may be configured to perform all the corresponding operations. Further, depending on the implementation, the location tagging system 191b may be configured to perform some of the operations that the location tagging system 191a may not be configured to perform, or vice versa. Further, in some implementations the first client device 103a may include the location tagging system 191a and the location server may not include the location tagging system 191b, or vice versa. As such, the location tagging systems 191a and 191b are depicted with dashed lines to indicate that the location tagging system 191 may be optionally stored in various locations. Additionally, referral to the "location tagging system 191" and its associated operations may refer to an individual location tagging system 191 (e.g., the location tagging system 191a or the location tagging system 191b, individually) or may refer to the location tagging systems 191a and 191b collectively.

As detailed below, the location tagging system 191 may be configured to tag locations along a travel route of the first client device 103a that may present problematic driving conditions based on data from one or more sensors 135 (illustrated as sensors 135a through 135n in FIG. 1). The data that may be generated by the sensors 135 may be referred to as "sensor data." In some implementations, the first client device 103a may be communicatively coupled to the sensors 135 via one or more signal lines. For example, the first client device 103a may be communicatively coupled to the sensor 135a via a signal line 140 and the first client device 103a may be communicatively coupled to the sensor 135n via a signal line 138.

In some implementations, the first client device 103a may be configured to receive the sensor data from the sensors 135 and may be configured to relay the sensor data to the location tagging system 191. For example, the first client device 103*a* may be configured to relay the sensor data to the location tagging system 191*b* of the location server 113 via the network 105, and/or to the location tagging system 191*a* of the first client device 103*a* via a bus of the first client device 103*a*.

One or more of the sensors 135 may be integrated with the first client device 103*a* or may be separate from the first client device 103*a*. The sensors 135 may include any suitable systems, apparatus, or device configured to generate sensor data that may indicate a location of a problematic travel condition. For example, the sensors 135 may include one or more GPS sensors configured to determine GPS coordinates of the first client device 103*a*, which may also indicate a location of a vehicle 101 with which the first client device 103*a* may be associated. Association of a particular client device 103 with a particular vehicle (e.g., associated of the first client device 103*a* with the vehicle 101) may include integration of the particular client device 103 with the particular vehicle and/or may include the particular client device 103 being a device separate from the particular vehicle but that may be transported inside of the particular vehicle. Further, reference to a journey, journey data, travel route, a location of, or the like of a particular client device 103 may also refer to the journey, journey data, travel route, the location of, or the like of a particular vehicle with which the particular client device 103 may be associated. Further, sensor data that indicates the location of a particular client device and/or its associated vehicle (e.g., the first client device 103*a* and/or the vehicle 101) may be referred to as location data.

Additionally, one or more of the sensors 135 may include any suitable system, apparatus, or device that may be configured to monitor behavior of an operator of the vehicle 101. The monitored behavior may indicate a problematic travel condition. For example, a problematic travel condition may cause the operator of the vehicle to slow the vehicle down or anticipate having to slow the vehicle down. Therefore, in some implementations, the sensors 135 may be configured to provide sensor data that may indicate that the operator of the vehicle 101 anticipated slowing the vehicle 101 down or that the operator of the vehicle 101 slowed the vehicle 101 down. In particular, in some implementations, the sensors 135 may include one or more imaging sensors configured to generate sensor data that includes images of actions of the operator that may indicate whether the operator anticipated applying a brake of the associated vehicle 101. For instance, in some implementations, the sensor data may include images of a foot of the operator that may indicate whether the foot transitions from a throttle (e.g., a gas pedal) of the vehicle 101 to hovering over or placement on a brake pedal of the vehicle 101.

In these or other implementations, the sensors 135 may include a braking sensor configured to monitor when a brake of the associated vehicle has been applied and/or a degree of application of the brake. Whether or not the brake has been applied and how the brake has been applied may also indicate a problematic travel condition. For example, a sudden and hard application of the brake may indicate that an unexpected and problematic travel condition has occurred.

In these or other implementations, one or more of the sensors 135 may be configured to monitor one or more biological metrics of the operator that may indicate a problematic travel condition. For example, an increase in heart rate, blood pressure, body temperature, and/or perspiration by the operator may indicate that the operator has an elevated amount of stress that may be due to an encountered a problematic travel condition. Therefore, in some implementations, one or more of the sensors 135 may be configured to monitor the heart rate, blood pressure, body temperature, perspiration, and/or any other applicable biological metric, of the operator such that the associated sensor data may indicate a problematic driving condition. Sensor data that indicates operator behavior and/or operator biological metrics may be referred to individually or collectively as "operator data." Additionally, operator behavior and/or operator biological metrics may be referred to individually or collectively as "operator metrics."

In some implementations, the sensors include a camera included in the interior of the vehicle. The camera may be configured to monitor eye gaze, pupil dilation or other optical conditions of a driver. Changes in these optical conditions may be due to an encountered a problematic travel condition.

The location tagging system 191 may be configured to tag locations that may present a problematic driving condition based on the sensor data. For example, in some instances, the operator data and the location data may indicate that the operator applied the brake, was going to apply the brake, and/or had an elevated level of stress when the first client device travels through a particular location. As such, the location tagging system 191 may determine that the particular location includes a problematic driving condition. In some implementations, the location tagging system 191 may tag the particular location as a problematic location. A location that may include a problematic driving condition may be referred to as a "problematic location."

In some implementations, the location tagging system 191 may be configured to receive an indication from the first user 125*a* of a problematic travel condition at a particular location and the location tagging system 191 may be configured to accordingly determine that the particular location is a problematic location. In these or other implementations, the first user 125*a* may also tag the location associated with the problematic travel condition as a problematic location that may be acknowledged and stored by the location tagging system 191 such that the location tagging system 191 may determine the problematic location based on the user input.

The location tagging system 191 may also be configured to monitor social network traffic that may be managed by the social network server 155 and the social network application 157. The location tagging system 191 may be configured to monitor the social network traffic for indications of problematic travel conditions at locations. For example, the location tagging system 191 may monitor social network traffic that may indicate traffic problems at a particular location. The location tagging system 191 may additionally be configured to determine and tag locations with problematic travel conditions as indicated by the social network traffic as problematic locations.

The location tagging system 191 may be configured to communicate the problematic locations to storage 141 of the location server 113. For example, the location tagging system 191*a* may be configured to communicate the problematic locations to the location server 113 via the network 105 and the location server 113 may be configured to store the received problematic locations on the storage 141. In these or other implementations, the location tagging system 191*b* may be configured to communicate the problematic locations to the storage 141 via a bus of the location server 113.

The storage 141 may be a non-transitory storage medium that stores data for providing the functionality described herein. The storage 141 may be a dynamic random access memory (DRAM) device, a static random access memory (SRAM) device, flash memory, or some other memory devices. In some implementations, the storage 141 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some implementations, the location server 113 may include a location aggregation system 193. The location aggregation system 193 may be configured to receive data regarding multiple problematic locations. The data regarding the multiple problematic locations may be received from any number of client devices 103. For example, although the above discussion regarding the determination of problematic travel conditions is given with respect to travel conditions that may be encountered by the first client device 103a, any number of other client devices 103 (e.g., the second client device 103b) and their associated vehicles may also encounter problematic travel conditions at one or more locations. Further, associated location tagging systems 191 (e.g., of the different client devices 103 and/or the location tagging system 191b of the location server 113) may determine and tag the corresponding problematic locations. Therefore, multiple problematic locations encountered by multiple client devices and their associated vehicles may be communicated to the location aggregation system 193.

In some implementations, the location aggregation system 193 may generate a map that indicates one or more of the problematic locations. In these or other implementations, the location aggregation system 193 may determine clusters of problematic locations that may indicate areas where problematic locations may be within a certain distance of each other. The clusters of problematic locations may be referred to as "problematic clusters." The location aggregation system 193 may tag the clusters as problematic driving condition hotspots (referred to hereinafter as "problematic hotspots"). In some implementations, the location aggregation system 193 may include the problematic hotspots in the map.

The second client device 103b may include a journey data module 195. The journey data module 195 may be configured to track a journey of the second client device 103b, to receive a current location and a desired destination of the second client device 103b, and/or to generate a proposed travel route for a journey of the second client device 103b. The second client device 103b may be configured to generate associated journey data that may indicate a potential travel route of the second client device 103b based on the tracked journey, the current location, the desired destination, and/or the proposed travel route.

The journey data module 195 may be configured to transmit associated journey data to the location server 113, e.g., via the network 105. In some implementations, the location server 113 may be configured to determine, based on the journey data and the stored problematic locations, whether a potential travel route of the second client device 103b may include one or more problematic locations. In some implementations, the location server 113 may be configured to communicate to the second client device 103b an indication of the problematic locations that may be found along the possible travel route. In these or other implementations, the second client device 103b may be configured to generate an associated notification for the second user 125b. Therefore, the second user 125b may take an alternate travel route or may be put on notice of an upcoming problematic location. In these or other implementations, the location server 113 or the second client device 103b may be configured to determine an alternate travel route that may avoid one or more of the problematic locations. In some implementations, the alternate travel route may be presented to the second user 125b.

Modifications, additions, or omissions may be made to the system 100 without departing from the scope of the present disclosure. For example, the locations of the modules and systems described herein are merely used for illustrative purposes. For instance, although not explicitly illustrated, in some implementations, the second client device 103b may include the location tagging system 191 and one or more sensors 135. In these or other implementations, the first client device 103a may include the journey data module 195.

Example Journey Data Module

Figure 2:
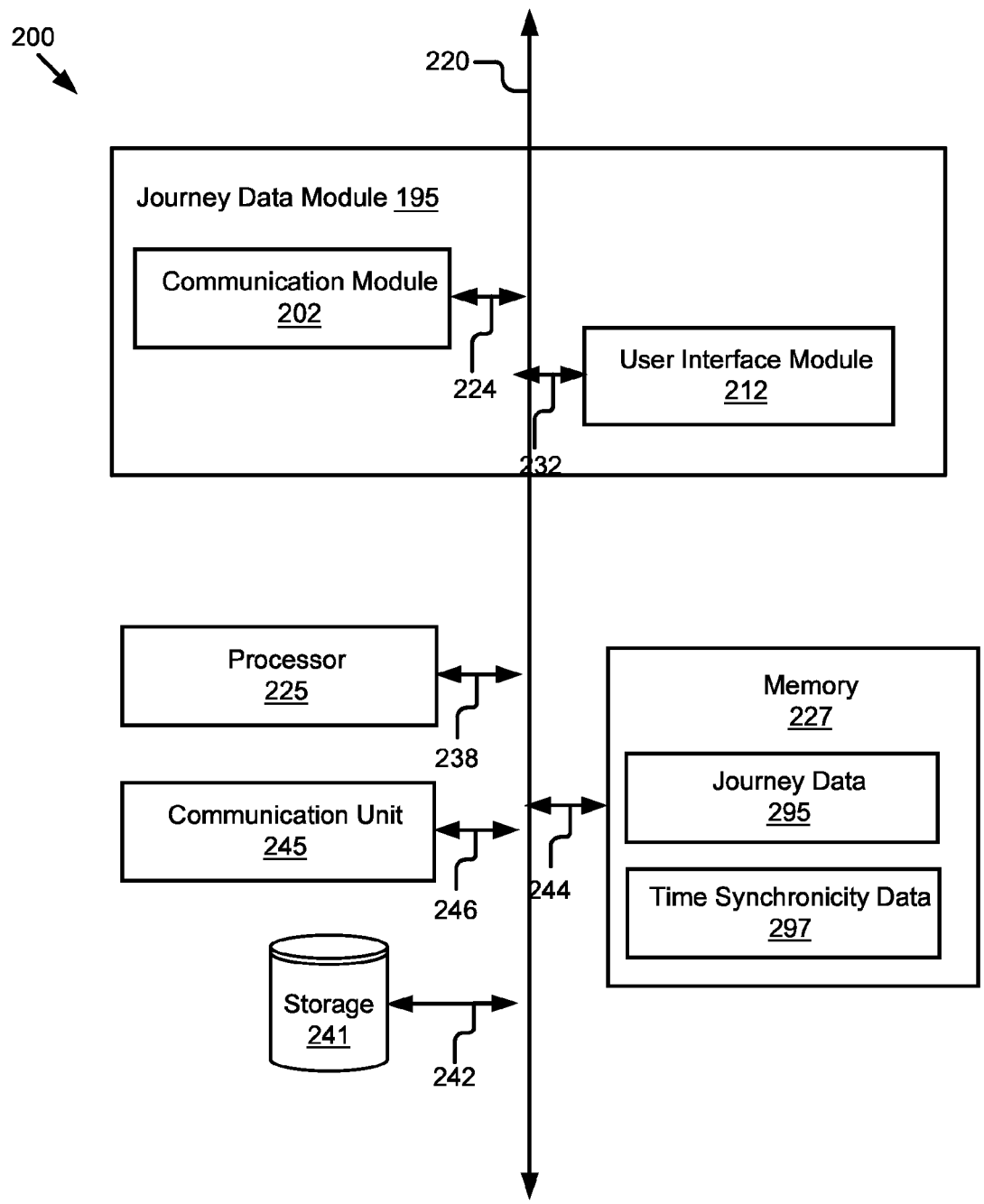
FIG. 2 is a block diagram illustrating an example computing device that includes an example journey data module.

FIG. 2 is a block diagram illustrating an example computing device 200 that includes an implementation of the journey data module 195 of FIG. 1. In some implementations, the computing device 200 may be included with the second client device 103b of FIG. 1. The computing device 200 includes the journey data module 195, a processor 225, a communication unit 245, a storage 241, and a memory 227 according to some examples. The components of the computing device 200 may be communicatively coupled by a bus 220. The bus 220 may include, but is not limited to, a controller area network (CAN) bus, a memory bus, a storage interface bus, a bus/interface controller, an interface bus, or the like or any combination thereof.

The processor 225 may include an arithmetic logic unit, a microprocessor, a general-purpose controller, or some other processor array configured to perform computations and provide electronic display signals to a display device. In the illustrated example, the processor 225 is coupled to the bus 220 for communication with the other components via a signal line 238. The processor 225 may process data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors 225 may be included. Other processors, operating systems, sensors, displays, and physical configurations may be possible. In some embodiments, the processor 225 may be programmed to perform or control performance of one or more steps of the methods 600, 700, 800. In some implementations, the system 200 may be a special-purpose computing device programmed to perform or control performance of one or more steps of the methods 600, 700, 800.

The memory 227 may be configured to store instructions or data that may be executed by the processor 225. The memory 227 may be coupled to the bus 220 for communication with the other components via a signal line 244. The instructions or data may include code for performing the techniques described herein. The memory 227 may be a dynamic random access memory (DRAM) device, a static random access memory (SRAM) device, flash memory, or some other memory device. In some implementations, the memory 227 may include a non-volatile memory or similar permanent storage and media including a hard disk drive, a floppy disk drive, a CD-ROM device, a DVD-ROM device, a DVD-RAM device, a DVD-RW device, a flash memory device, or some other mass storage for storing information on a more permanent basis.

As illustrated in FIG. 2, the memory 227 may store journey data 295. The journey data 295 may include historical journey data. This historical journey data may be associated with a corresponding client device (e.g., the second client device 103b of FIG. 1) and its associated vehicle. The historical journey data may include data describing information such as routes, start points, destinations, durations, departure times, arrival times, directions, etc. associated with historical journeys of the corresponding client device. For example, the journey data 295 may include a log of all locations visited by the second client device 103b, a vehicle associated with the second client device 103b, or a user of the second client device 103b (e.g., the second user 125b). The journey data 295 may describe locations requested by a user (e.g., the second user 125b) via a navigation system or map application.

In addition to including historical journey data indicating previous travel routes of the corresponding client device, the journey data 295 may include data indicating a current travel route of the corresponding client device, and/or a potential travel route of the corresponding client device. In some implementations, the journey data 295 may also include problematic locations that may be along the previous travel routes, the current travel route, and/or the potential travel routes. Further, in these or other implementations, the journey data 295 may include weather data that may also correspond to the travel routes.

In some implementations, the memory 227 may also store time synchronicity data 297. The time synchronicity data 297 may include information describing a universal time shared among one or more systems associated with the network 105 of FIG. 1. The time synchronicity data 297 may be data used to synchronize a system time with a universal time. For example, the time synchronicity data 297 may be configured to synchronize a local time associated with a client device 103 with a universal time. For example, the time synchronicity data 297 may describe one or more times associated with one or more historic journeys described by the journey data 295. In some implementations, the time synchronicity data 297 combined with the journey data 295 may indicate that problematic travel conditions may occur at problematic locations at particular times of day, during certain days of the week, during certain months, and/or on certain dates. For example, the combination of the time synchronicity data 297 and the journey data 295 may indicate that a problematic travel condition may occur at a problematic location in the morning on weekdays, but not on weekends.

The communication unit 245 may be configured to transmit and receive data to and from any other entities of the system 100 of FIG. 1. The communication unit 245 is coupled to the bus 220 via a signal line 246. In some implementations, the communication unit 245 includes a port for direct physical connection to the network 105 of FIG. 1 or to another communication channel. For example, the communication unit 245 may include a universal serial bus (USB) port, a secure digital (SD) port, a category 5 cable (CAT-5) port, or similar port for wired communication with another device. In some implementations, the communication unit 245 includes a wireless transceiver for exchanging data with any suitable entity of the system 100 of FIG. 1 or other communication channels using one or more wireless communication methods, including IEEE 802.11, IEEE 802.16, BLUETOOTH®, or another suitable wireless communication method.

In some implementations, the communication unit 245 includes a cellular communications transceiver for sending and receiving data over a cellular communications network including via SMS, MMS, HTTP, direct data connection, WAP, e-mail, or another suitable type of electronic communication. In some implementations, the communication unit 245 includes a wired port and a wireless transceiver. The communication unit 245 also provides other conventional connections to the network 105 of FIG. 1 for distribution of files or media objects using standard network protocols including transmission control protocol/internet protocol (TCP/IP), HTTP, HTTP secure (HTTPS), and simple mail transfer protocol (SMTP), dedicated short range communication (DSRC) for vehicle-to-vehicle transmission of digital data, etc.

The storage 241 may be a non-transitory storage medium that stores data for providing the functionality described herein. The storage 241 may be a dynamic random access memory (DRAM) device, a static random access memory (SRAM) device, flash memory, or some other memory devices. In some implementations, the storage 241 also includes a non-volatile memory or similar permanent storage and media including a hard disk drive, a floppy disk drive, a CD-ROM device, a DVD-ROM device, a DVD-RAM device, a DVD-RW device, a flash memory device, or some other mass storage for storing information on a more permanent basis. The storage 241 is communicatively coupled to the bus 220 via a signal line 242. The storage 241 may also store data that was temporarily stored in the memory 227.

In the illustrated implementation of FIG. 2, the journey data module 195 includes a communication module 202 and a user interface module 212. The components of the journey data module 195 are communicatively coupled to the bus 220. For example, the communication module 202 may be communicatively coupled to the bus 220 via a signal line 224 and the user interface module 212 may be communicatively coupled to the bus 220 via a signal line 232.

The communication module 202 may include software including routines for handling communications between the journey data module 195 and other components of the computing device 200. The communication module 202 may also be configured to send and receive data, via the communication unit 245, to and from one or more entities of the system 100 of FIG. 1.

The user interface module 212 may include software that includes routines for generating graphical data for providing user interfaces. In some implementations, the user interface module 212 generates graphical data for providing a user interface that allows a user (e.g., the second user 125b) to input data via the user interface. For example, the user may input problematic location information via the user interface. The user interface module 212 may also be configured to send the graphical data to a display coupled to the computing device 200 for presenting the user interface to the user. In some implementations, the user interface module 212 may generate graphical data or audio data for providing notifications to the user. For example, in some implementations, the user interface module 212 may generate a graphical and/or audio notification of a problematic location.

The journey data module 195 may include software including routines for generating the journey data 295, including performing the operations as described in herein. For example, in some implementations, the journey data module 195 may be configured to track a current travel route of the second client device 102b. The journey data module 195 may be configured to determine a likely future travel route based on the current trajectory of the second client device 102b. In these or other implementations, the journey data module 195 may be configured to determine the likely future travel route based on previous travel routes also. For example, the current travel route may substantially match that of a previous travel route over a particular area such that the journey data module 195 may determine that the current travel route may continue in a manner similar to the previous travel route. Therefore, the journey data module 195 may determine that a likely future travel route may substantially follow the previous travel route.

The journey data module 195 may also be configured to determine a possible travel route based on a destination and current location of the corresponding client device 103. For example, the journey data module 195 may be configured to receive desired destination information and current location information of the second client device 103b and may be configured to determine a possible travel route using stored map data. In these or other implementations, the journey data module 195 may be configured to access a third party mapping application (e.g., Google® maps) to determine the possible travel route.

In these or other implementations, the journey data module 195 may be configured to communicate the possible travel route to the location server 113. As detailed below, the location server 113 may be configured to notify the journey data module 195 of problematic locations that may be along the possible travel route. In some implementations, the journey data module 195 may be configured to notify a user (e.g., the second user 125b) of the problematic locations before the problematic locations are encountered along the travel route. Therefore, when the user is an operator of an associated vehicle that is about to encounter the problematic location, the user may accordingly prepare for the problematic location.

In these or other implementations, the journey data module 195 may determine an alternative travel route or the location server 113 may determine the alternative travel route and may communicate the alternative travel route to the journey data module 195. Description of determination of the alternative travel route is given below with respect to operations that may be performed by a trip planning module 310 of the location tagging system 191 in FIG. 3. However, in some implementations, one or more of the same operations may be performed by a trip planning module of the journey data module 195 instead of or in addition to being performed by the trip planning module 310.

In some implementations, the journey data module 195 may be stored in a single server or device. In some other implementations, the journey data module 195 may be distributed and stored across multiple servers or devices. Furthermore, the separation of various components, modules, and servers in the implementations described herein should not be understood as requiring such separation in all implementations. In some implementations, the described components, modules, devices, or servers can generally be integrated together in a single component, module, device, or server.

In some implementations, the modules 195, 202, and 212 may be a set of instructions that may be executable by the processor 225. In these or other implementations, one or more of the modules 195, 202, and 212 may be stored in the memory 227 and may be accessible and executable by the processor 225 of the computing device 200. One or more of the modules 195, 202, and 212 may be adapted for cooperation and communication with the processor 225 and other components of the computing device 200. In some implementations, one or more of the modules 195, 202, and 212 may be adapted to function as one or more thin clients that are stored and executed by a processor of the computing device 200.

Example Location Tagging System

Figure 3:
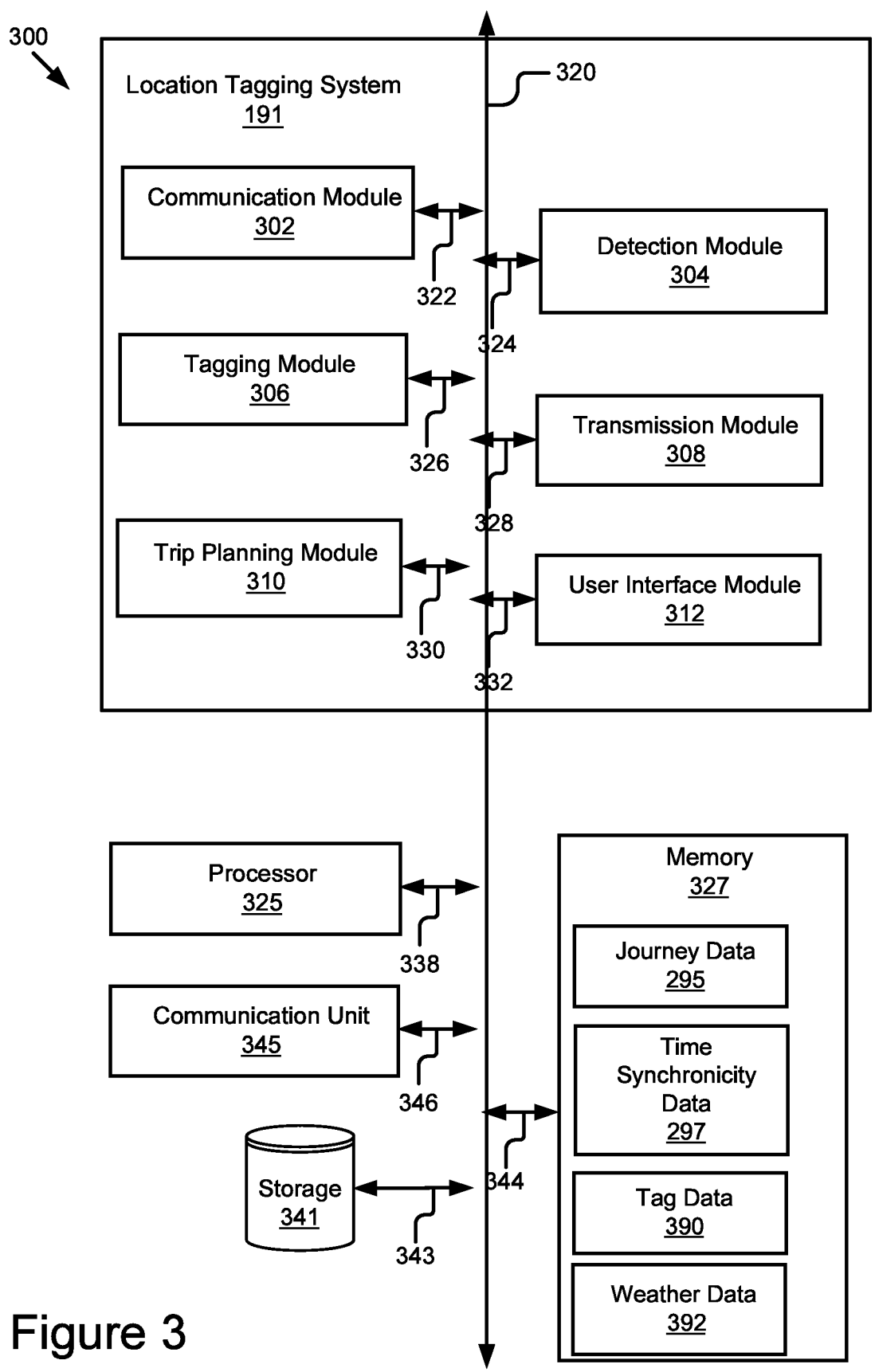
FIG. 3 is a block diagram illustrating an example computing device that includes an example location tagging system.

FIG. 3 is a block diagram illustrating an example computing device 300 that includes an implementation of the location tagging system 191 of FIG. 1. As illustrated in FIG. 1, in some implementations, the computing device 300 may be included with the first client device 103a and/or the location server 113 of FIG. 1. The computing device 300 includes the location tagging system 191, a processor 325, a communication unit 345, a storage 341, and a memory 327 according to some examples. The components of the computing device 300 may be communicatively coupled by a bus 320.

The processor 325 may have a structure similar to the processor 225 and may provide functionality similar to the processor 225. The processor 325 may be coupled to the bus 320 for communication with other components via a signal line 338. The communication unit 345 may have a structure similar to the communication unit 245 and may provide functionality similar to the communication unit 245. The communication unit 345 may be coupled to the bus 320 for communication with other components via a signal line 346. The storage 341 may have a structure similar to the storage 241 and may provide functionality similar to the storage 241. The storage 341 may be coupled to the bus 320 for communication with other components via a signal line 343.

The memory 327 may have a structure similar to the memory 227 and may provide functionality similar to the memory 227. The memory 327 may be coupled to the bus 320 for communication with other components via a signal line 344. The memory 327 may also include the journey data 295 and the time synchronicity data 297 described with respect to FIG. 2. Further, the memory 327 may include tag data 390 and weather data 392 that may be associated with the tag data 390.

The tag data 390 may include data associated with one or more problematic locations. For example, the tag data 390 may include GPS coordinates of problematic locations and indications that the problematic locations have been tagged as including problematic travel conditions. As described below, the tag data 390 may be determined by a tagging module 306 of the location tagging system 191.

The weather data 392 may include weather conditions at a problematic location. In some implementations, the weather data 392 may be received from the weather server 170 and the weather service 172. In some implementations, the weather data 392 may include the weather conditions at the problematic location at the time that an associated problematic condition at the problematic location is present. In these or other implementations, correlation of the weather data 392 at the corresponding time of the problematic travel condition being present may be based on the time synchronicity data 297. For example, the time synchronicity data 297 may indicate that a problematic travel condition was present at a particular problematic location, as indicated by particular tag data 390, at a particular time and date. Further, one or more weather conditions at the particular problematic location at the particular time and date may be received (e.g., as requested by the tagging module 306, as described below) from the weather server 170 and the weather service 172 and may then be stored as particular weather data 392 that may be associated with the particular tag data 390.

The weather data 392 may be used to determine whether weather conditions played a role in the problematic location having a problematic travel condition. For example, particular weather data 392 associated with particular tag data 390 may indicate that a problematic travel condition is present at a particular problematic location regardless of what the weather conditions are such that the problematic travel conditions at the particular problematic location may not necessarily be weather related. In contrast, in other instances, particular weather data 392 may indicate that in almost every incidence of a problematic travel condition at the particular problematic location some sort of precipitation had recently fallen or was currently falling in the area around the particular problematic location indicated in the particular tag data 390. Therefore, it may be determined that precipitation played a role in creating the problematic travel condition at the particular problematic location.

In the illustrated implementation of FIG. 3, the location tagging system 191 includes a communication module 302, a tagging module 306, a trip planning module 310, a detection module 304, a transmission module 308, and a user interface module 312. The components of the location tagging system 191 may be communicatively coupled to the bus 320. For example, the communication module 302 may be communicatively coupled to the bus 320 via a signal line 322, the tagging module 306 may be communicatively coupled to the bus 320 via a signal line 326, the trip planning module 310 may be communicatively coupled to the bus 320 via a signal line 330, the detection module 304 may be communicatively coupled to the bus 320 via a signal line 324, the transmission module 308 may be communicatively coupled to the bus 320 via a signal line 328, and the user interface module 312 may be communicatively coupled to the bus 320 via a signal line 332.

The communication module 302 may include software including routines for handling communications between the location tagging system 191 and other components of the computing device 300. The communication module 302 may also be configured to send and receive data, via the communication unit 345, to and from one or more entities of the system 100 of FIG. 1. In some implementations, the communication module 302 receives data from one or more of the modules of the location tagging system 191 and stores the data in one or more of the storage 341 and the memory 327. In these or other implementations, the communication module 302 may be configured to retrieve data from the storage 341 or the memory 327 and to send the data to one or more of the modules of the location tagging system 191.

The detection module 304 may include software including routines for determining a problematic travel condition at a problematic location. For example, the detection module 304 may be configured to receive sensor data (e.g., operator data) from one or more of the sensors 135 that may indicate the presence of a problematic travel condition. In these or other implementations, the detection module 304 may be configured to receive the time synchronicity data 297. Based on the sensor data and the time synchronicity data 297, the detection module 304 may be configured to determine the occurrence of a particular problematic travel condition at a particular time. For instance, the operator data may indicate that the operator applied the brake, was going to apply the brake, and/or had an elevated level of stress at a particular time Additionally, the detection module 304 may be configured to receive location data in conjunction with the other sensor data and/or based on the time synchronicity data 297 such that the location of a particular problematic travel condition at the particular time may be determined. For example, the detection module 304 may be configured to request sensor data that includes location data when the particular problematic travel condition is determined such that a corresponding location may be determined. In these or other implementations, the detection module 304 may be configured to poll the journey data 295 for the location of the first client device 103*a* and/or the vehicle 101 at the time, e.g., as indicated by the time synchronicity data 297, when the particular problematic travel condition was determined. As such, the detection module 304 may be configured to determine a problematic travel condition at a problematic location. In some implementations, the detection module 304 may be configured to determine a problematic travel condition at a problematic location according to a method 600 described below.

In these or other implementations, the detection module 304 may be configured to determine a problematic travel condition at a problematic location based on social network data and traffic. For example, the detection module 304 may be configured to monitor social network traffic that may indicate traffic problems at a particular location. When the social network traffic indicates as such, the detection module 304 may determine that a problematic travel condition may be present at a particular location as indicated by the social network data and traffic.

Further, in some implementations, the detection module 304 may be configured to receive an indication from a user (e.g., the first user 125*a*) of a problematic travel condition at a particular location via the user interface module 312. Therefore, the detection module 304 may be configured to determine a problematic travel condition at a particular location based on a user input in some implementations.

The tagging module 306 may include software including routines for tagging a problematic location that may be determined by the detection module 304. For example, the tagging module 306 may be configured to receive the problematic travel condition and the problematic location from the detection module 304 and may accordingly tag the problematic location as including the problematic travel condition. In some implementations, the tagging module 306 may be configured to direct that the problematic location and associated data ("problematic location data") be stored in tag data 390 in the memory 327. Further, the tagging module 306 may be configured to tag time synchronicity data 297 that may be associated with when the problematic travel condition occurred and may be configured to direct that the tagged time synchronicity data 297 be stored in the memory 327 and correlated with its corresponding problematic location data. Problematic location data may include the GPS or other orientation coordinates of the problematic location, an identifier of the client device that determined the problematic travel condition at the problematic location, a metric used to determine the problematic travel condition, etc.

In these or other implementations, the tagging module 306 may be configured to request weather data 392 from the weather server 170 and the weather service 172 that may indicate one or more weather conditions at the tagged problematic location around the time that the problematic travel condition was occurred. The tagging module 306 may be configured to tag the received weather data 392 as being associated with the problematic travel condition and the problematic location. For example, the tagging module 306 may be configured to tag the received weather data 392 as being associated with the corresponding problematic location information. In some implementations, the tagging module 306 may be configured to direct that the tagged weather data 392 be stored in the memory 327. Referral to the problematic location data of a problematic location may also include referral to the corresponding weather data 392 and time synchronicity data 297.

The trip planning module 310 may include software including routines for determining a travel route for a trip of a client device. The trip planning module 310 may be configured to determine the travel route based on one or more of the journey data 295, the tag data 390, the time synchronicity data 297, and the weather data 392. In some implementations, the trip planning module 310 may be configured to determine a proposed travel route for the trip where the proposed travel route may avoid one or more problematic locations based on one or more of the journey data 295, the tag data 390, the time synchronicity data 297, and the weather data 392.

For example, a possible travel route of the second client device 103*b* and the tag data 390 may indicate that the possible travel route of the second client device 103*b* may include one or more problematic locations. Therefore, the trip planning module 310 may be configured to determine an alternate travel route that may avoid one or more of the problematic locations.

In some instances, avoidance of one or more problematic locations may be impractical or undesired. Therefore, in some implementations, the trip planning module 310 may be configured to highlight the problematic locations when generating a travel route such that the operator of the vehicle may anticipate where problematic travel conditions may occur.

In these or other implementations, the trip planning module 310 may be configured to check weather data 392 that may be associated with a particular problematic location that may be along the possible travel route. In these or other implementations, the trip planning module 310 may be configured to determine whether a problematic travel condition at the particular problematic location corresponds to one or more weather conditions. When it is determined that the problematic travel condition corresponds to one or more weather conditions, the trip planning module 310 may request from the weather server 170 and the weather service 172 weather data associated with current and forecasted weather conditions at the particular problematic location. The trip planning module 310 may compare the current and forecasted weather conditions with the weather conditions that were present at the particular problematic location when the problematic travel conditions occurred. If the current and forecasted weather conditions are substantially similar to those that correspond to when the problematic travel condition was occurred, the trip planning module 310 may be configured to generate the alternate travel route to avoid the particular problematic location. However, if the current and forecasted weather conditions are not substantially similar to those that correspond to when the problematic travel condition was present at the particular problematic location, the trip planning module 310 may be configured to generate the alternate travel route to include the particular problematic location.

In some instances, a problematic travel condition at a problematic location may be associated with a particular date or time of time. Therefore, in some implementations, the trip planning module 310 may be configured to check time synchronicity data 297 associated with one or more problematic locations to see if the problematic travel conditions that were occurred at any of the corresponding problematic locations correspond to similar times and/or dates. When it is determined that the problematic travel condition for a particular problematic location corresponds to a particular time and/or dates, the trip planning module 310 may determine, based on the possible travel route, whether the associated client device (e.g., the second client device 103b) may pass through the particular problematic location at a similar time and/or date. If it is determined that the associated client device may pass through the particular problematic location at a similar time and/or date, the trip planning module 310 may be configured to generate the alternate travel route to avoid the particular problematic location. However, if it is determined that the associated client device may not pass through the particular problematic location at a similar time and/or date, the trip planning module 310 may be configured to generate the alternate travel route to include the particular problematic location.

In some implementations, the trip planning module 310 may be configured to determine the possible travel route of the second client device 103b based on journey data 295 associated with the second client device 103b in a manner similarly described above with respect to the journey data module 195 determining the possible travel route. In these or other implementations, the possible travel route may have been determined by the journey data module 195, communicated to the computing device 300 via the network 105, and stored in the journey data 295.

The transmission module 308 may include software that includes routines for transmitting problematic location data to other entities of the system 100 via the network 105. By way of example, the transmission module 308 may be configured to direct the transmission of problematic location data from the location server 113 to the second client device 103b via the network 105 or from the first client device 103a to the location server 113 via the network 105.

As indicated above, the problematic location data may include any information that may pertain to the problematic locations. For example, the problematic location data may include where problematic locations are located on a map, orientation coordinates of the problematic locations, weather conditions associated with experiencing problematic travel conditions of the problematic locations, time synchronicity data associated with the problematic locations, etc.

The user interface module 312 may include software that includes routines for generating graphical data for providing user interfaces. In some implementations, the user interface module 312 generates graphical data for providing a user interface that allows a user (e.g., the first user 125a) to input data via the user interface. For example, the user may input problematic location information via the user interface. The user interface module 312 may also be configured to send the graphical data to a display coupled to the computing device 300 for presenting the user interface to the user. In some implementations, the user interface module 312 may generate graphical data or audio data for providing notifications to the user. For example, in some implementations, the user interface module 312 may generate a graphical and/or audio notification of a problematic location.

In some implementations, the modules of the location tagging system 191 may be stored in a single server or device. In some other implementations, the modules of the location tagging system 191 may be distributed and stored across multiple servers or devices. Furthermore, the separation of various components, modules, and servers in the implementations described herein should not be understood as requiring such separation in all implementations. In some implementations, the described components, modules, devices, or servers can generally be integrated together in a single component, module, device, or server.

In some implementations, the modules of the location tagging system 191 may be a set of instructions that may be executable by the processor 325. In these or other implementations, one or more of the modules of the location tagging system 191 may be stored in the memory 327 and may be accessible and executable by the processor 325 of the computing device 300. One or more of the modules of the location tagging system 191 may be adapted for cooperation and communication with the processor 325 and other components of the computing device 300. In some implementations, one or more of the modules of the location tagging system 191 may be adapted to function as one or more thin clients that are stored and executed by a processor of the computing device 300.

Example Location Aggregation System

Figure 4:
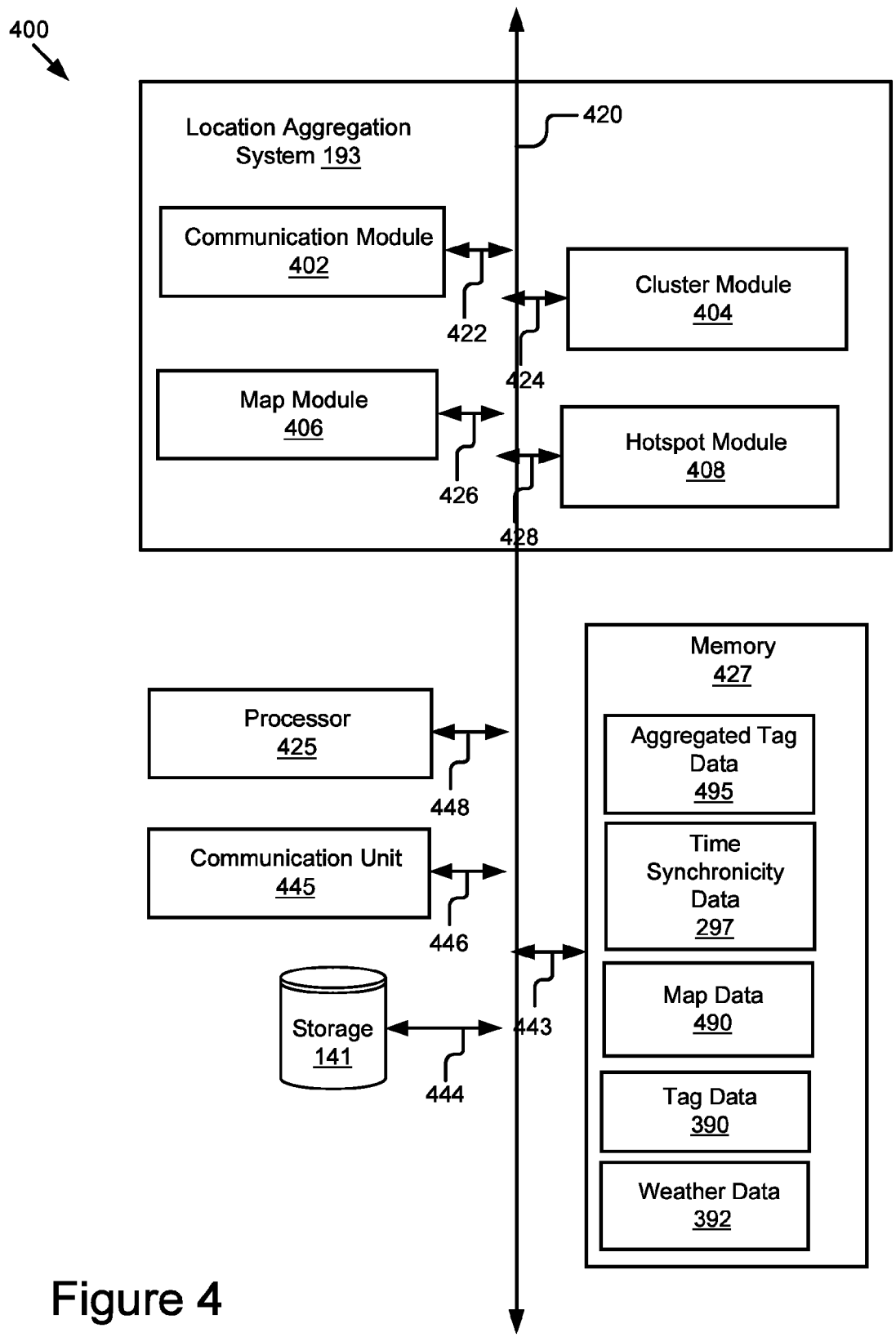
FIG. 4 is a block diagram illustrating an example computing device that includes an example location aggregation system.

FIG. 4 is a block diagram illustrating an example computing device 400 that includes an implementation of the location aggregation system 193 of FIG. 1. As illustrated in FIG. 1, in some implementations, the computing device 400 may be included with the location server 113 of FIG. 1. The computing device 400 includes the location aggregation system 193, a processor 425, a communication unit 445, the storage 141, and a memory 427 according to some examples. The components of the computing device 400 may be communicatively coupled by a bus 420.

The processor 425 may have a structure similar to the processors 225 and 325 and may provide functionality similar to the processors 225 and 325. The processor 425 may be coupled to the bus 420 for communication with other components via a signal line 448. The communication unit 445 may have a structure similar to the communication units 245 and 345 and may provide functionality similar to the communication units 245 and 345. The communication unit 445 may be coupled to the bus 420 for communication with other components via a signal line 446. The storage 141 is described above with respect to FIG. 1 and may be coupled to the bus 420 for communication with other components via a signal line 444.

The memory 427 may have a structure similar to the memories 227 and 327 and may provide functionality similar to the memories 227 and 327. The memory 427 may be coupled to the bus 420 for communication with other components via a signal line 443. The memory 427 may include the time synchronicity data 297 described with respect to FIGS. 2 and 3. Additionally, the memory 427 may include the tag data 390 and the weather data 392 described above with respect to FIG. 3. Further, the memory 427 may include aggregated tag data 495 and map data 490 that may be associated with the aggregated tag data 495.

The aggregated tag data 495 may include tag data 390 for multiple problematic locations. In some implementations, problematic locations of the aggregated tag data 495 may be organized according to problematic clusters that may indicate relative proximity of one or more problematic locations with one or more other problematic locations. In these or other implementations, one or more of the problematic clusters may be designated as problematic hotspots. As described below, in some implementations, the problematic clusters may be organized by a cluster module 404 of the location aggregation system 193 and the problematic hotspots may be determined by a hotspot module 408 of the location aggregation system 193.

In some implementations, the map data 490 may include data that indicates the locations of the problematic locations on a map. In some implementations, the cluster module 404 and/or the hotspot module 408 may determine the problematic clusters and/or the problematic hotspots, respectively, based on the map data 490. Further, in some implementations, the map data 490 may include graphical map data that may be presented to a user to illustrate the locations of the problematic locations. In some implementations, a map may be built describing the hotspots and used to configure routes to avoid the hotspots.

In the illustrated implementation of FIG. 4, the location aggregation system 193 includes a communication module 402, the cluster module 404, a map module 406, and the hotspot module 408. The components of the location aggregation system 193 may be communicatively coupled to the bus 420. For example, the communication module 402 may be communicatively coupled to the bus 420 via a signal line 422, the cluster module 404 may be communicatively coupled to the bus 420 via a signal line 424, the map module 406 may be communicatively coupled to the bus 420 via a signal line 426, and hotspot module 408 may be communicatively coupled to the bus 420 via a signal line 428.

The communication module 402 may include software including routines for handling communications between the location aggregation system 193 and other components of the computing device 400. The communication module 402 may also be configured to send and receive data, via the communication unit 445, to and from one or more entities of the system 100 of FIG. 1. In some implementations, the communication module 402 receives data from one or more of the modules of the location aggregation system 193 and stores the data in one or more of the storage 141 and the memory 427. In these or other implementations, the communication module 402 may be configured to retrieve data from the storage 141 or the memory 427 and to send the data to one or more of the modules of the location aggregation system 193.

The cluster module 404 may include software including routines for determining problematic clusters of problematic locations. For example, the cluster module 404 may be configured to identify one or more problematic locations that are within a certain distance with one or more other problematic locations based on the tag data 390. When problematic locations are within the certain distance with another problematic location, the cluster module 404 may be configured to organize and tag them as being included in the same problematic cluster.

For example, the cluster module 404 may be configured to tag problematic locations that are within 100 meters of each other as being included in a problematic cluster. The tag data 390 may indicate a first problematic location, a second problematic location, and a third problematic location. The tag data 390 may also include first location data (e.g., GPS data) for the first problematic location, second location data for the second problematic location, and third location data for the third problematic location. The first location data, the second location data, and the third location data may indicate that the first problematic location may be within 100 meters of the second problematic location and that the third problematic location may be within 100 meters of both the first problematic location and the second problematic location. Therefore, the cluster module 404 may designate and tag the first problematic location, the second problematic location, and the third problematic location as being in a same problematic cluster. The distance between problematic locations such that they may be designated and tagged as being within the same problematic cluster may vary. For example, the distance may be as low as less than a meter to as high as several kilometers in some implementations.

Additionally, in some implementations, the cluster module 404 may be configured to determine problematic clusters within problematic clusters. For example, the cluster module 404 may be configured to determine a first problematic cluster based on problematic locations that are within a kilometer of each other and may be configured to determine a second problematic cluster based on which problematic locations of the first problematic cluster are within 10 meters of each other.

The cluster module 404 may direct that the designation of which problematic locations may be clustered together and their associated clusters be stored in the aggregated tag data 495. Further, the cluster module 404 may direct that other cluster information about the problematic clusters be stored in the aggregated tag data 495. Data pertaining to the problematic clusters that may be stored with the aggregated tag data 495 may be referred to as "cluster data." The cluster data may include information regarding one or more of an identifier or designation of a problematic cluster, how many problematic locations are included in the corresponding problematic cluster, how many different client devices and/or vehicles determined the problematic locations in the corresponding problematic cluster, the metrics used to determine the problematic cluster (e.g., how close the problematic locations are to each other to be deemed as included in the same cluster), GPS or other orientation coordinates of the problematic clusters, etc.

The hotspot module 408 may include software including routines for determining problematic hotspots of problematic locations. For example, the hotspot module 408 may be configured to analyze the cluster data to determine areas that may have large concentrations of problematic locations based on the problematic clusters indicated in the cluster data. In these or other implementations, a problematic cluster that satisfies one or more parameters may be designated as a problematic hotspot. For example, a problematic cluster that satisfies a threshold number of problematic locations may be designated as a problematic hotspot. In these or other implementations, a problematic cluster may be designated as a problematic hotspot when a certain number of different client devices and/or vehicles associated with the problematic cluster is reached. Therefore, in these implementations, a particularly nervous driver may not necessarily cause a problematic hotspot designation. Further, in some implementations, the problematic cluster may be designated as a problematic hotspot based on the metrics used to the determine the problematic cluster—e.g., a problematic cluster may be designated as a problematic hotspot based on how close the problematic locations in the problematic cluster are to each other. In these or other implementations, a problematic hotspot may include a group of problematic locations that are a subset of a problematic cluster.

The hotspot module 408 may direct that the designation of which problematic locations and/or problematic clusters may be included in and designated as problematic hotspots be stored in the aggregated tag data 495. Further, the hotspot module 408 may designate that other hotspot data be stored in the aggregated tag data 495. Data pertaining to the problematic hotspots that may be stored with the aggregated tag data 495 may be referred to as "hotspot data." The hotspot data may include information regarding one or more of an identifier or designation of a problematic hotspot, how many problematic locations are included in the corresponding problematic hotspot, how many different client devices and/or vehicles determined the problematic locations in the corresponding problematic hotspot, the metrics used to determine the problematic hotspot (e.g., how close the problematic locations are to each other to be deemed as included in the same cluster), GPS or other orientation coordinates of the problematic hotspot, etc.

The map module 406 may include software including routines for generating a map that indicates the locations of one or more of problematic locations, problematic clusters, and problematic hotspots. For example, the map module 406 may be configured retrieve from the tag data 390 location information associated with locations (e.g., GPS coordinates) of the problematic locations. The map module 406 may be configured to retrieve other data that includes a map of an area that includes one or more of the problematic locations. In some implementations, the data that includes a map of the area may be stored in the map data 490 and retrieved therefrom, additionally or alternatively, the data that includes a map of the area may be retrieved via the network 105, e.g., via a third-party mapping application such as Google® maps.

The map module 406 may be configured to populate the map of the area with the problematic locations based on their associated location data. The population of the map with the problematic locations may provide a visual indication of problematic clusters and/or problematic hotspots. In these or other implementations, the map module 406 may also be configured to indicate, highlight, and/or label locations on the map that include problematic clusters and/or problematic hotspots. In some implementations, the map module 406 may be configured to store the mapping of the problematic locations, problematic clusters, and/or problematic hotspots in the map data 490.

In some implementations, the map data 490 generated by the map module 406 may be communicated to the trip planning module 310 of FIG. 3 such that the trip planning module 310 may generate travel routes based on the locations of problematic locations, problematic clusters, and/or problematic hotspots. For example, the trip planning module 310 may generate travel routes that prioritize avoiding problematic hotspots.

The map data 490 generated by the map module 406 may also be communicated to the user interface modules 212 and/or 312 of FIGS. 2 and 3. Therefore, the user interface module 212 and/or 312 may provide notifications of the problematic locations, problematic clusters, and/or problematic hotspots. For example, in some implementations, the user interface module 212 and/or 312 may display a map that illustrates the locations of one or more problematic locations in an area that is associated with a potential travel route of the associated client device and/or vehicle.

Figure 5:
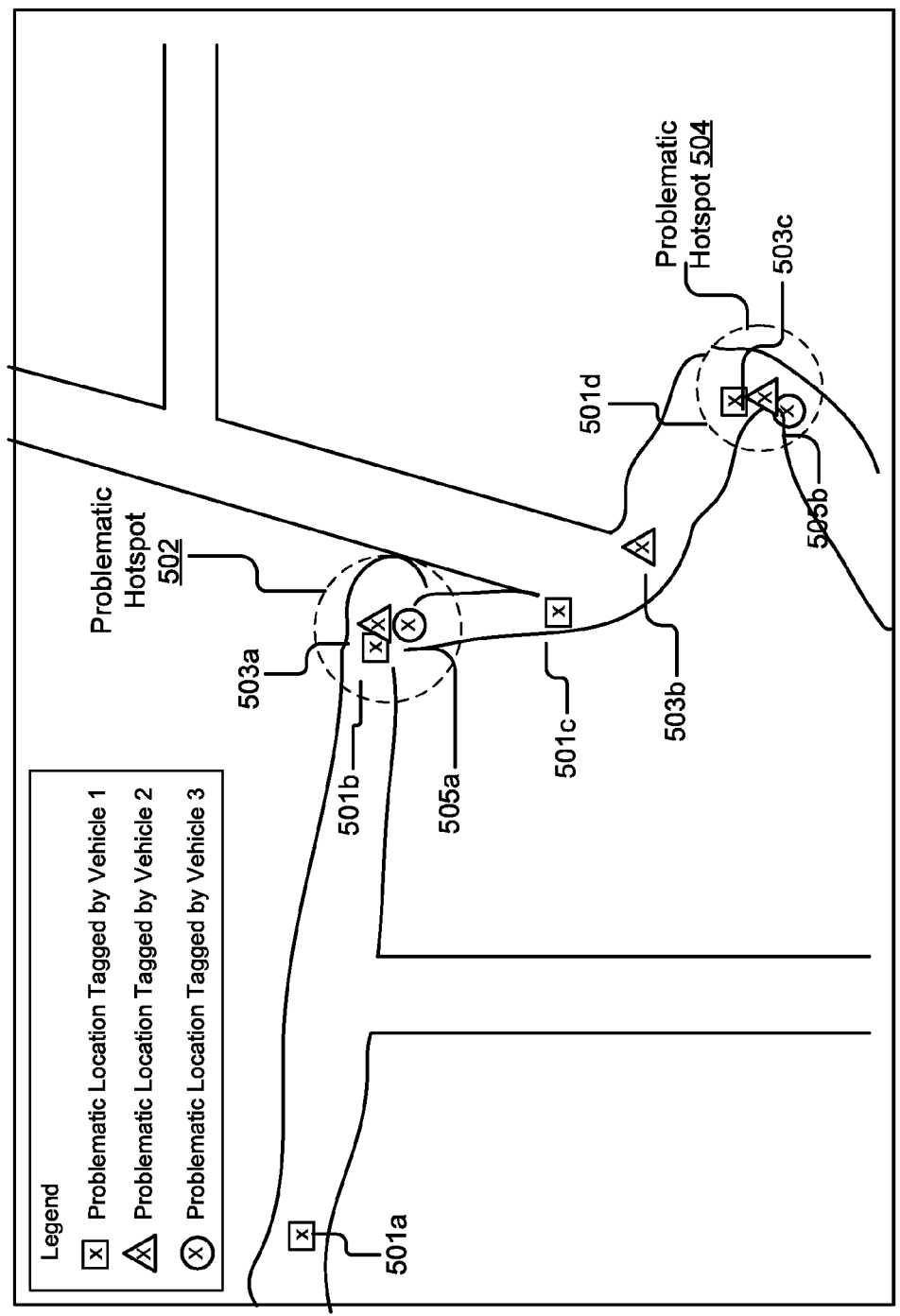
FIG. 5 is an example map that may be presented to a user.

By way of example, FIG. 5 depicts an example map 500 that may be presented to a user. The map 500 may include problematic locations 501 that may be tagged by a first vehicle (e.g., tagged by a first client device associated with the first vehicle), problematic locations 503 that may be tagged by a second vehicle (e.g., tagged by a second client device associated with the second vehicle), and problematic locations 505 that may be tagged by a third vehicle (e.g., tagged by a third client device associated with the third vehicle). The map 500 may also include and indicate problematic hotspots 502 and 504 that may indicate areas with a concentrated number of problematic locations.

The map 500 is merely an example and actual maps that may be generated may vary. For example, the number of problematic locations, problematic hotspots, and problematic locations associated with different vehicles is merely depicted as an example. Further, the amount of area that may be depicted on any given map may vary widely.

Returning to FIG. 4, in some implementations, the modules of the location aggregation system 193 may be stored in a single server or device. In some other implementations, the modules of the location aggregation system 193 may be distributed and stored across multiple servers or devices. Furthermore, the separation of various components, modules, and servers in the implementations described herein should not be understood as requiring such separation in all implementations. In some implementations, the described components, modules, devices, or servers can generally be integrated together in a single component, module, device, or server.

In some implementations, the modules of the location aggregation system 193 may be a set of instructions that may be executable by the processor 425. In these or other implementations, one or more of the modules of the location aggregation system 193 may be stored in the memory 427 and may be accessible and executable by the processor 425 of the computing device 400. One or more of the modules of the location aggregation system 193 may be adapted for cooperation and communication with the processor 425 and other components of the computing device 400. In some implementations, one or more of the modules of the location aggregation system 193 may be adapted to function as one or more thin clients that are stored and executed by a processor of the computing device 400.

Methods

Figure 6:
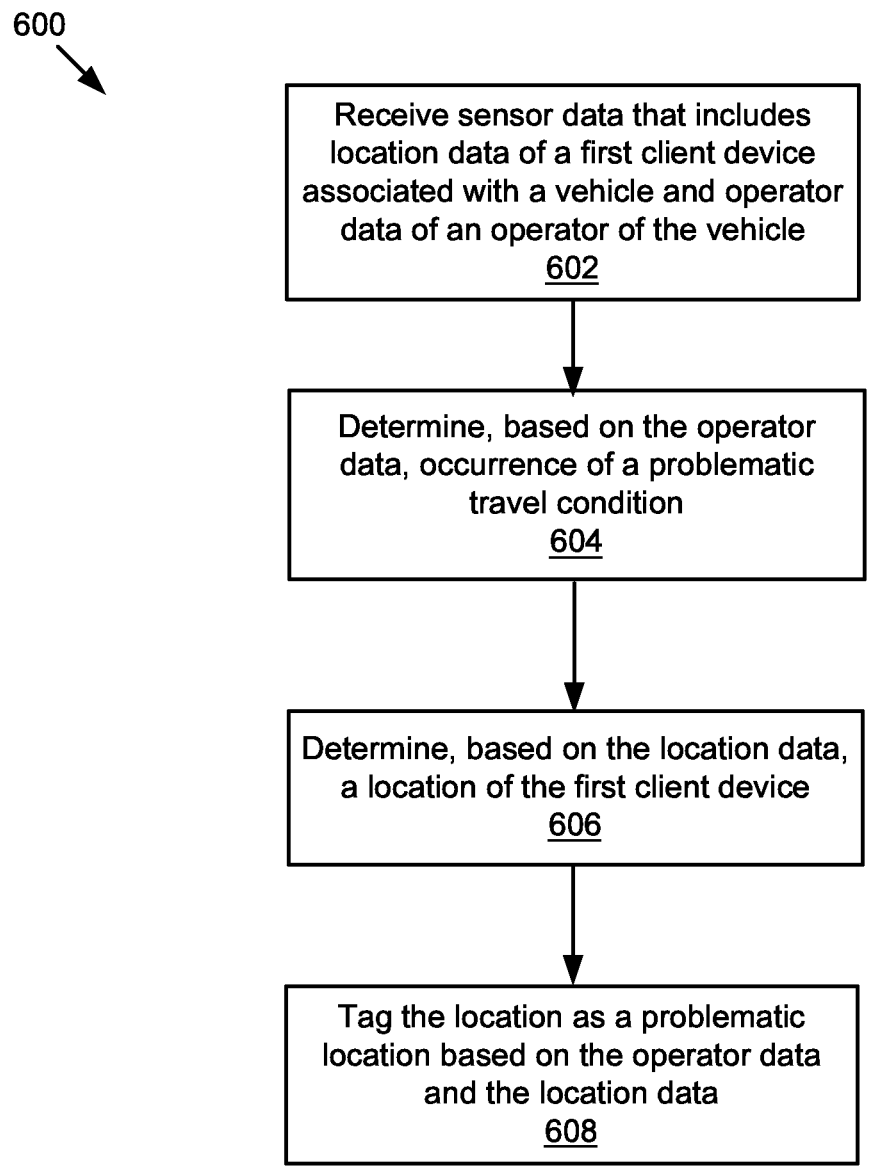
FIG. 6 is a flowchart of an example method to determine a problematic location.

FIG. 6 is a flowchart of an example method 600 to determine a problematic location. The method 600 may be implemented, in whole or in part, by the location tagging system 191 of FIGS. 1 and 3, or another suitable device or system. For this and other processes and methods disclosed herein, the operations performed in the processes and methods may be implemented in differing order. Furthermore, the outlined operations are only provided as examples, and some of the operations may be optional, combined into fewer operations, supplemented with other operations, or expanded into additional operations without detracting from the essence of the disclosed implementations.

In some implementations, the method 600 includes receiving 602 sensor data. The sensor data may include location data of a first client device that is associated with a vehicle. The sensor data may also include operator data of an operator of the vehicle. Further, the sensor data may be generated by one or more sensors associated with the vehicle.

The method 600 also includes determining 604, based on the operator data, occurrence of a problematic travel condition. For example, the operator data may indicate an elevated level of stress of the operator such that occurrence of a problematic travel condition may be determined. As another example, the operator data may indicate that the operator anticipated applying a brake of the vehicle such that occurrence of a problematic travel condition may be determined.

The method 600 may also include determining 606, based on the location data, a location of the first client device at a time when the problematic travel condition occurred. In some implementations, the time at which the problematic travel condition occurred may be determined based on time synchronicity data. The method 600 may also include tagging 608 the location as a problematic location based on the operator data and the location data. As such, a location that corresponds to a problematic travel condition may be determined.

Although not illustrated in FIG. 6, the method 600 may include one or more other steps or operations. For example, the method 600 may include receiving weather data associated with when the problematic travel condition occurred and determining that the problematic corresponds to a weather condition based on the weather data. In these or other implementations, the time at which the problematic travel condition occurred may be determined based on time synchronicity data.

Some implementations disclosed herein include a computer program product including a non-transitory computer-usable medium that includes a computer-readable program. Execution of the computer-readable program on a computer may cause the computer to perform or may cause the computer to control performance of the method 600 and/or variations thereof. The non-transitory computer-usable medium may include, for example, the storage 141 of FIGS. 1 and 4, the storage 241 of FIG. 2, the memory 227 of FIG. 2, the storage 341 of FIG. 3, the memory 327 of FIG. 3, and/or the memory 427 of FIG. 4. The computer-readable program may include, for example, the location tagging system 191 of FIGS. 1 and 3. The computer may include, for example, the computing devices 200, 300, or 400 of FIGS. 2-4.

Figure 7:
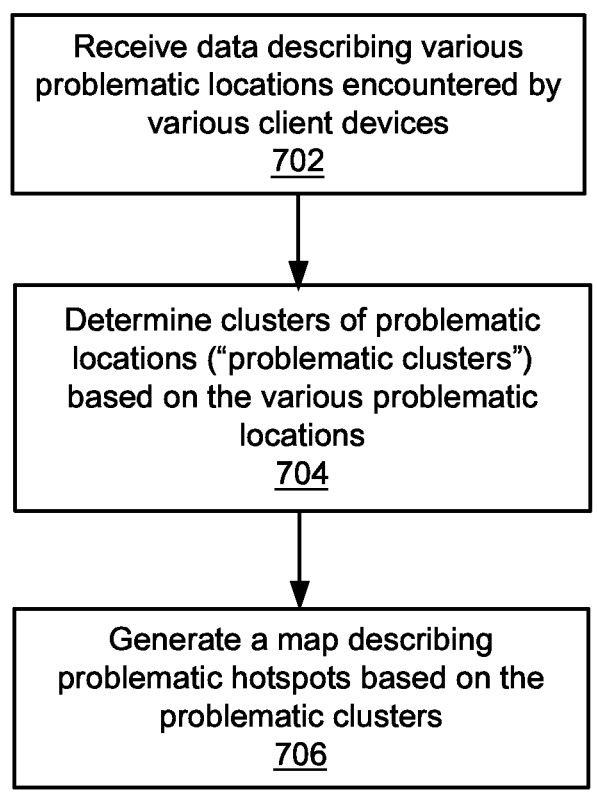
FIG. 7 is a flowchart of an example method to determine a problematic hotspot.

FIG. 7 is a flowchart of an example method 700 to determine a problematic hotspot. The method 700 may be implemented, in whole or in part, by the location aggregation system 193 of FIGS. 1 and 4, or another suitable device or system. For this and other processes and methods disclosed herein, the operations performed in the processes and methods may be implemented in differing order. Furthermore, the outlined operations are only provided as examples, and some of the operations may be optional, combined into fewer operations, supplemented with other operations, or expanded into additional operations without detracting from the essence of the disclosed implementations.

In some implementations, the method 700 includes receiving 702 data that describes various problematic locations that may be encountered by various client devices. The method 700 also includes determining 704, based on the various problematic locations, problematic clusters of problematic locations. The determination of the problematic clusters may be based on any one or more of the metrics described above. The method 700 may also include generating 706, based on the problematic clusters, a map that describes one or more problematic hotspots. The map may be generated based on one or more of the principles and operations described above.

Although not illustrated in FIG. 7, the method 700 may include one or more other steps or operations. For example, the method 700 may include determining the problematic hotspots based on the problematic clusters. The determination of the problematic hotspots may be based on one or more of the metrics described above. Additionally or alternatively, the map may be presented to a client device such that the client device may be notified of the problematic hotspots.

Some implementations disclosed herein include a computer program product including a non-transitory computer-usable medium that includes a computer-readable program. Execution of the computer-readable program on a computer may cause the computer to perform or may cause the computer to control performance of the method 700 and/or variations thereof. The non-transitory computer-usable medium may include, for example, the storage 141 of FIGS. 1 and 4, the storage 241 of FIG. 2, the memory 227 of FIG. 2, the storage 341 of FIG. 3, the memory 327 of FIG. 3, and/or the memory 427 of FIG. 4. The computer-readable program may include, for example, the location aggregation system 193 of FIGS. 1 and 4. The computer may include, for example, the computing devices 200, 300, or 400 of FIGS. 2-4.

Figure 8:
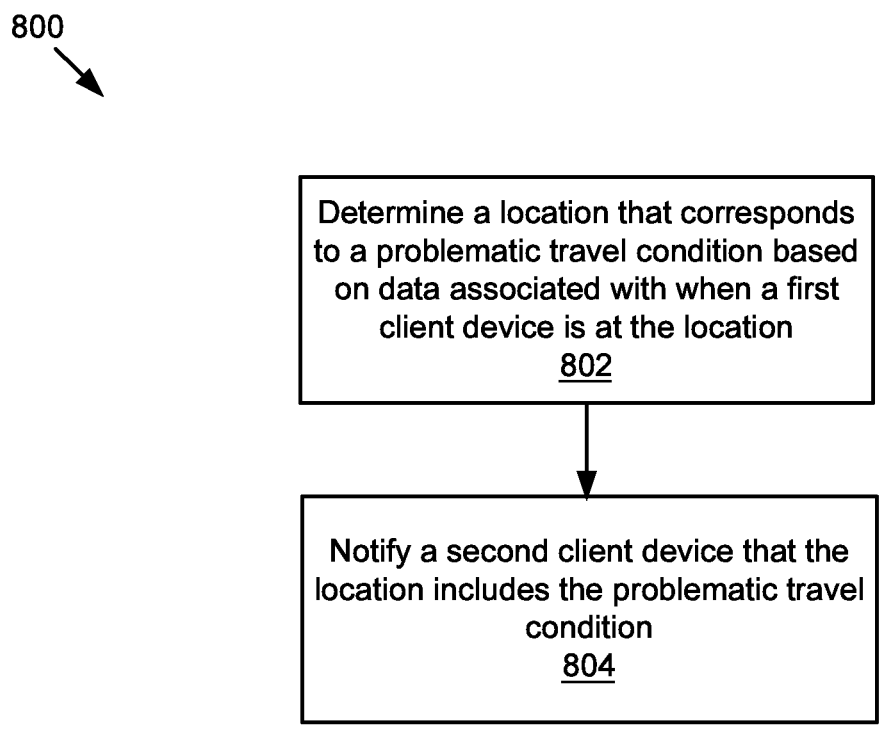
FIG. 8 is a flowchart of an example method to determine a problematic hotspot.

FIG. 8 is a flowchart of an example method 800 to determine a problematic hotspot. The method 800 may be implemented, in whole or in part, by the location tagging system 191 of FIGS. 1 and 3, the server 113 or another suitable device or system. For this and other processes and methods disclosed herein, the operations performed in the processes and methods may be implemented in differing order. Furthermore, the outlined operations are only provided as examples, and some of the operations may be optional, combined into fewer operations, supplemented with other operations, or expanded into additional operations without detracting from the essence of the disclosed implementations.

In some implementations, the method 800 includes determining 802 a location that corresponds to a problematic travel condition based on data associated with when a first client device is at the location. In some implementations, one or more operations described with respect to the method 600 may be performed for the determining that the location corresponds to a problematic travel condition. In these or other implementations, the determining may be reception of data that indicates that the location corresponds to the problematic travel condition where one or more operations described with respect to the method 600 have been performed previously by another entity. For example, the location tagging system 191a of FIG. 1 may determine that the location corresponds to a problematic travel condition and may relay the corresponding data and information to the server 113. The reception of the corresponding data and information by the server 113 may be used by the server 113 to determine that the location corresponds to a problematic travel condition and is therefore a problematic location.

The method 800 may also include notifying 804, a second client that the location corresponds to the problematic location. In some implementations, the notification to the second client device may be based on the second client device having a possible travel route that includes the location. The notification may also include a notification for a user and may include, for example, an audio notification, a visual notification, or both. Further, in some implementations, the notification may include the transmission of data to the second client device that indicates the problematic location. Additionally or alternatively, a map may be generated that indicates the problematic location and corresponding map data may be transmitted to the second client device as the notification.

Although not illustrated in FIG. 8, the method 800 may include one or more other steps or operations. For example, the method 800 may include any one or more of the steps and operations described with respect to the methods 600 and 700 of FIGS. 6 and 7, respectively.

Some implementations disclosed herein include a computer program product including a non-transitory computer-usable medium that includes a computer-readable program. Execution of the computer-readable program on a computer may cause the computer to perform or may cause the computer to control performance of the method 700 and/or variations thereof. The non-transitory computer-usable medium may include, for example, the storage 141 of FIGS. 1 and 4, the storage 241 of FIG. 2, the memory 227 of FIG. 2, the storage 341 of FIG. 3, the memory 327 of FIG. 3, and/or the memory 427 of FIG. 4. The computer-readable program may include, for example, the location aggregation system 193 of FIGS. 1 and 4. The computer may include, for example, the computing devices 200, 300, or 400 of FIGS. 2-4.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
   determining a location that corresponds to a problematic travel condition based on data associated with when a first client device is at the location;
   adding the location to a plurality of problematic locations encountered by a plurality of first client devices;
   storing tag data describing the plurality of problematic locations and the geographic location of the plurality of problematic locations;
   updating a digital map describing the plurality of problematic locations based on the location being added to the plurality of problematic locations, wherein the updating includes:
   analyzing the geographic locations of the plurality of problematic locations to identify a plurality of problematic clusters, wherein each problematic cluster included at least two problematic locations that are within a predetermined distance of each other;
   analyzing each problematic cluster included in the plurality of problematic clusters to determine a presence of a neighboring problematic cluster;
   determining how close each problematic cluster is to the neighboring problematic cluster;
   determining, for each problematic cluster included in the plurality of problematic clusters, a first number of problematic locations that are included in the problematic cluster and whether the first number satisfies a first threshold number of problematic locations; and
   determining a presence of one or more problematic hotspots included in the digital map based on (1) how close each problematic cluster is to the neighboring problematic cluster and (2) the first threshold number being satisfied, wherein each problematic hotspot is a geographic area included in the digital map where vehicle operators experience difficulty; and
   notifying a second client device with a possible travel route that includes the location that the location includes the problematic travel condition, wherein the digital map describes the plurality of problematic locations, the plurality of problematic clusters and the one or more problematic hotspots.

2. The method of claim 1, further comprising providing the second client device with an alternate travel route that avoids the location based on the problematic travel condition at the location, wherein the alternative travel route is determined by analyzing the digital map to determine the alternate travel route that avoids (1) the plurality of problematic locations, (2) the plurality of problematic clusters and (3) the one or more problematic hotspots.

3. The method of claim 1, wherein the data is based on one or more sensors of a vehicle of which the first client device is associated.

4. The method of claim 1, wherein the data indicates an elevated level of stress of an operator of a vehicle when the first client device is at the location.

5. The method of claim 1, wherein the data indicates anticipation of applying a brake of a vehicle by an operator of the vehicle while at the location.

6. The method of claim 1, further comprising:
   receiving time synchronicity data associated with when the problematic travel condition occurred;
   receiving weather data about the location that corresponds to the time synchronicity data; and
   determining that the problematic travel condition corresponds to a weather condition based on the weather data.

7. The method of claim 6, wherein the first client device is a first vehicle, the second client device is a second vehicle, the first client device and the second client device are included in a fleet of vehicles and the time synchronicity data describes a universal time shared among the fleet of vehicles so that the time synchronicity data is common among the first vehicle and the second vehicle.

8. The method of claim 1 further comprising:
   determining a second number of clients that have provided data indicating that the location is a problematic location;
   determining whether a second threshold has been satisfied; and
   determining whether to include the location in the plurality of travel locations based on whether the second threshold has been satisfied, wherein the second threshold is greater than one and prevents the location from being included in the plurality of problematic locations due to data from only one first client device.

9. The method of claim 1, wherein one of the one or more problematic hotspots includes a group of problematic locations that is a subset of one of the problematic clusters.

10. The method of claim 1 wherein the one or more problematic hotspots are described by hotspot data that includes: an identifier of each problematic hotspot; information describing how many problematic locations are included in each problematic hotspot; information describing how many different client devices have provided data associated with the problematic locations included in the each problematic hotspot; information describing how close the problematic locations are to each other; and GPS orientation coordinates describing each problematic hotspot.

11. A system configured to update a digital map that is configured to determine travel routes that avoid problematic hotspots, the system comprising:
one or more processors; and
a non-transitory memory communicatively coupled to the one or more processors, the non-transitory memory storing instructions that when executed cause the system to:
determine a location that corresponds to a problematic travel condition based on data associated with when a first client device is at the location;
add the location to a plurality of problematic locations encountered by a plurality of first client devices;
store tag data describing the plurality of problematic locations and the geographic location of the plurality of problematic locations;
update the digital map describing roadways of a geographic area and a set of problematic hotspots present in the geographic area where vehicle operators experience difficulty, wherein the digital map is stored in the non-transitory memory and the updating includes updating the set of problematic hotspots included in the digital map based on the location being added to the plurality of problematic locations, wherein the digital map is configured to determine travel routes that avoid the set of problematic hotspots;
notify, based on the location being included in one of the one or more problematic hotspots of the digital map, a second client device with a possible travel route that includes the location of the problematic travel condition at the location.

12. The system of claim 11, wherein the instructions further cause the system to provide the second client device with an alternate travel route that avoids the location based on the problematic travel condition at the location.

13. The system of claim 11, wherein the data is based on one or more sensors of a vehicle of which the first client device is associated.

14. The system of claim 11, wherein the data indicates an elevated level of stress of an operator of a vehicle of which the first client device while at the location.

15. The system of claim 11 wherein the data indicates anticipation of applying a brake of a vehicle by an operator of the vehicle while at the location.

16. The system of claim 11, wherein the digital map is configured so that the location is only included the set of problematic hotspots under certain limited weather conditions and the instructions further cause the system to:
receive time synchronicity data describing a universal time shared among the first client device and the second client device while the second client device will be present at the location;
receive weather data about the location that corresponds to the time synchronicity data and describes a weather condition present at the location when the second client device will be present at the location; and
determine whether the weather condition present at the location is one of the certain limited weather conditions which results in the locating being included in the set of problematic hotspots;
wherein the second client device is not notified responsive to the weather condition present at the location not being one of the certain limited weather conditions which results in the locating being included in the set of problematic hotspots.

17. The system of claim 16, wherein the certain limited weather conditions include any weather condition corresponding to a flooding event at the location when the second client device will be present at the location.

18. The system of claim 11, wherein the instructions further cause the system to determine one or more problematic travel conditions at a plurality of locations based on data associated with when one or more first client devices are at the plurality of locations.

19. The system of claim 11, wherein the instructions further cause the system to:
determine a cluster of problematic travel condition locations based on the plurality of locations; and
determine the problematic travel condition hotspot based on the cluster of problematic travel condition locations.

20. The system of claim 11, wherein the instructions further cause the system to monitor a social network for social network traffic that indicates a roadway traffic problem at the location and temporarily update the digital map based at least in part on the social network traffic indicating a roadway traffic problem at the location.

21. A system configured to enable client devices to avoid problematic hotspots using a dedicated short range communication (DSRC) protocol network, the system comprising:
an DSRC protocol network;
a fleet of first client devices communicatively coupled to the DSRC protocol network, wherein each of the first client devices included in the fleet includes a sensor set for collecting sensor data describing associated with the first client devices, wherein the sensor data includes location data describing each geographic location of the first client devices and operator data describing each operator of the first client devices;
a second client device communicatively coupled to the DSRC protocol network, wherein the second client device includes a processor and a non-transitory memory storing map data describing a digital map of a geographic area and journey data describing a future journey of the second client device having an end point which is an end of the future journey;
wherein the processor of the second client device receives the sensor data from the DSRC protocol network and, based on the location data and the operator data included in the sensor data, executes steps including:
determining a set of problematic hotspots in the geographic area where a plurality of operators of a plurality of the first client devices experience difficulty;
updating the map data so that the digital map includes the set of problematic hotspots;
analyzing the future journey and the set of problematic hotspots to determine whether the future journey includes travel through one of the set of problematic hotspots;
determining an alternate journey that includes a travel route that minimizes travel through the set of problematic hotspots while still maintaining the end point of the future journey;

selecting a channel of the DSRC protocol network that corresponds to transmitting the map data; and
transmitting the map data to the DSRC protocol network for receipt by a third client device that is communicatively coupled to the DSRC protocol network.

\* \* \* \* \*